(12) United States Patent
Aggarwal et al.

(10) Patent No.: US 11,003,862 B2
(45) Date of Patent: May 11, 2021

(54) CLASSIFYING STRUCTURAL FEATURES OF A DIGITAL DOCUMENT BY FEATURE TYPE USING MACHINE LEARNING

(71) Applicant: Adobe Inc., San Jose, CA (US)

(72) Inventors: Milan Aggarwal, Pitampura (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 180 days.

(21) Appl. No.: 16/359,402

(22) Filed: Mar. 20, 2019

(65) Prior Publication Data

US 2020/0302016 A1    Sep. 24, 2020

(51) Int. Cl.
| | | |
|---|---|---|
| *G06F 40/30* | (2020.01) | |
| *G06F 16/93* | (2019.01) | |
| *G10L 15/02* | (2006.01) | |
| *G06N 3/04* | (2006.01) | |
| *G06N 3/08* | (2006.01) | |

(52) U.S. Cl.
CPC .............. *G06F 40/30* (2020.01); *G06F 16/93* (2019.01); *G06N 3/0445* (2013.01); *G06N 3/08* (2013.01); *G10L 15/02* (2013.01)

(58) Field of Classification Search
CPC ...... G06F 16/93; G06F 17/2785; G06F 40/30; G06N 3/0445; G06N 3/08; G10L 15/02; G06K 9/00442
See application file for complete search history.

(56) References Cited

U.S. PATENT DOCUMENTS

| | | | |
|---|---|---|---|
| 7,779,355 B1 | 8/2010 | Erol et al. | |
| 7,965,891 B2 | 6/2011 | Handley et al. | |
| 8,233,714 B2 | 7/2012 | Zuev et al. | |
| 9,535,882 B2 | 1/2017 | Craven et al. | |
| 2007/0143272 A1 | 6/2007 | Kobayashi | |
| 2008/0005667 A1* | 1/2008 | Dias ........................ | G06F 16/84 715/235 |
| 2009/0067729 A1 | 3/2009 | Turkelson et al. | |

(Continued)

OTHER PUBLICATIONS

"IBM Datacap Insight Edition", Retrieved at: http://www-01.ibm.com/common/ssi/cgi-bin/ssialias?subtype=SP&infotype=PM&htmlfid=IMS14489USEN&a—on Sep. 25, 2017, 4 pages.

(Continued)

*Primary Examiner* — Angela A Armstrong
(74) *Attorney, Agent, or Firm* — FIG. 1 Patents

(57) ABSTRACT

Classifying structural features of a digital document by feature type using machine learning is leveraged in a digital medium environment. A document analysis system is leveraged to extract structural features from digital documents, and to classifying the structural features by respective feature types. To do this, the document analysis system employs a character analysis model and a classification model. The character analysis model takes text content from a digital document and generates text vectors that represent the text content. A vector sequence is generated based on the text vectors and position information for structural features of the digital document, and the classification model processes the vector sequence to classify the structural features into different feature types. The document analysis system can generate a modifiable version of the digital document that enables its structural features to be modified based on their respective feature types.

21 Claims, 13 Drawing Sheets

(56) References Cited

U.S. PATENT DOCUMENTS

| | | | |
|---|---|---|---|
| 2010/0128922 A1 | 5/2010 | Navon et al. | |
| 2015/0129653 A1 | 5/2015 | Gupta et al. | |
| 2016/0132495 A1* | 5/2016 | Ghatage | G06F 40/106 707/756 |
| 2016/0217119 A1 | 7/2016 | Dakin et al. | |
| 2017/0046324 A1 | 2/2017 | Hu | |
| 2017/0046622 A1 | 2/2017 | Gaither et al. | |
| 2017/0075873 A1 | 3/2017 | Shetty et al. | |
| 2017/0132866 A1 | 5/2017 | Kuklinski et al. | |
| 2017/0286415 A1 | 10/2017 | Kumar | |
| 2018/0033147 A1 | 2/2018 | Becker et al. | |
| 2019/0258854 A1* | 8/2019 | Hosabettu | G06K 9/66 |
| 2020/0285878 A1* | 9/2020 | Wang | G06K 9/6201 |

OTHER PUBLICATIONS

"IBM Datacap insight Edition", Retrieved at: http://www-01.ibm.com/common/ssi/cgi-bin/ssialias?subtype=SP&infotype=PM&htmlfid=IMS14489USEN&a—on Dec. 5, 2018, Jun. 2018, 6 pages.

"IBM Datacap Mobile Product Demo", Retrieved at: https://www.youtube.com/watch?v=TMwAam0TMkQ, Mar. 1, 2016, 2 pages.

"Non-Final Office Action", U.S. Appl. No. 15/925,059, dated Mar. 8, 2019, 23 pages.

"TensorFlow", Retrieved at: https://www.tensorflow.org/—on Sep. 25, 2017, 4 pages.

"Understanding LSTM Networks", Retrieved at: http://colah.github.io/posts/2015-08-Understanding-LSTMs/, Aug. 27, 2015, 8 pages.

Joulin,"Bag of Tricks for Efficient Text Classification", Aug. 9, 2016, 5 pages.

Karapathy,"The Unreasonable Effectiveness of Recurrent Neural Networks", Andrej Karapathy Blog—Retrieved at: http://karpathy.github.io/2015/05/21/rnn-effectiveness/, May 21, 2015, 30 pages.

Li,"Classification of Text Documents", The Computer Journal, vol. 41, No. 8, 1998, Jan. 1998, pp. 537-546.

Luong,"Effective Approaches to Attention-based Neural Machine Translation", Sep. 20, 2015, 11 pages.

Manevitz,"One-Class SVMs for Document Classification", Journal of Machine Learning Research 2, Dec. 2001, pp. 139-154.

Olah,"Understanding LSTM Networks", Retrieved at: http://colah.github.io/posts/2015-08-Understanding-LSTMs/, Aug. 27, 2015, 8 pages.

Schuster,"Bidirectional Recurrent Neural Networks", IEEE Transactions on Signal Processing, vol. 45, No. 11, Nov. 1997, 10 pages.

"Final Office Action", U.S. Appl. No. 15/925,059, dated Aug. 8, 2019, 26 pages.

"Pre-Interview First Office Action", U.S. Appl. No. 15/925,059, dated Mar. 27, 2019, 6 pages.

"Non-Final Office Action", U.S. Appl. No. 15/925,059, dated Mar. 6, 2020, 9 pages.

"Notice of Allowance" issued in U.S. Appl. No. 15/925,059, dated Oct. 5, 2020, 7 pages.

"Corrected Notice of Allowability", U.S. Appl. No. 15/925,059, dated Jan. 8, 2021, 2 pages.

* cited by examiner

CLASSIFYING STRUCTURAL FEATURES OF A DIGITAL DOCUMENT BY FEATURE TYPE USING MACHINE LEARNING

BACKGROUND

Document analytics systems are implemented to analyze digital documents and determine attributes of digital documents that cannot be determined, solely, by human users. For instance, consider image-based digital documents such as Portable Document Format (PDF) documents developed by Adobe® Inc. A typical document analytics system can perform an optical scan of an image-based digital document to produce a digitized version of the image-based digital document. Such digitized versions, however, are typically read-only such that content from the digitized versions cannot be edited or manipulated in different ways.

To enable content to be extracted from image-based digital documents, some conventional document analytics systems can perform optical character recognition (OCR) on such digital documents to convert image-based text from the documents into machine-encoded text that can be manipulated (e.g., edited, copied, pasted, and so forth) in various ways. While OCR techniques can be utilized for recognition of text strings, such techniques are typically unable to recognize and categorize higher-order features such as bulleted lists, tables, check boxes, fillable fields, and so forth, that have internal logical arrangements. Accordingly, since conventional document analytics systems are unable to categorize such higher-order features from digital documents, this prevents such systems from generating digitized versions of digital documents that can be accurately rearranged into different forms while preserving the semantic integrity of such higher-order features.

For instance, consider a scenario where an image-based digital document that is created on a large form factor device such as a desktop computer is to be displayed on a small form-factor device such as a smartphone. To enable the image-based digital document to be properly reformatted for display on the small device, higher-order features in the digital document would likely need to be recognized such that their structural and/or semantic integrity is preserved when the digital document is reformatted. Since conventional document analytics systems are typically unable to recognize such higher-order features, these systems would likely be unable to properly reformat the image-based digital document in a way that preserves the integrity of the features. This may result in a conventional document analysis system generating a reformatted version of the image-based digital document that fails to preserve a visual and/or logical arrangement of its higher-order features, and/or that is logically undecipherable by a viewing user. Further, manual (e.g., user-implemented) approaches to reformatting image-based digital documents are unfeasible for large digital documents and collections of digital documents, and such scenarios require a tremendous expenditure of time and computer resources.

Thus, conventional document analytics systems are unable to recognize and categorize higher-order features from digital documents. Further, due to the sheer volume of content in digital documents and collections of digital documents, user-implemented manual categorization and reformatting of digital documents is infeasible. As a result, conventional ways for digitizing and reformatting image-based digital documents typically cannot be utilized to provide reformatted versions of image-based digital documents that preserve the structure and arrangement of higher-order structural features of the digital documents.

SUMMARY

Classifying structural features of a digital document by feature type using machine learning is leveraged in a digital medium environment. A document analysis system is leveraged to extract structural features from digital documents, and to classify the structural features by respective feature types. To do this, the document analysis system employs a character analysis model and a classification model. The character analysis model takes text content from a digital document and generates text vectors that represent the text content. A vector sequence is generated based on the text vectors and position information for structural features of the digital document, and the classification model processes the vector sequence to classify the structural features into different feature types. The document analysis system can generate a modifiable version of the digital document that enables its structural features to be modified based on their respective feature types.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
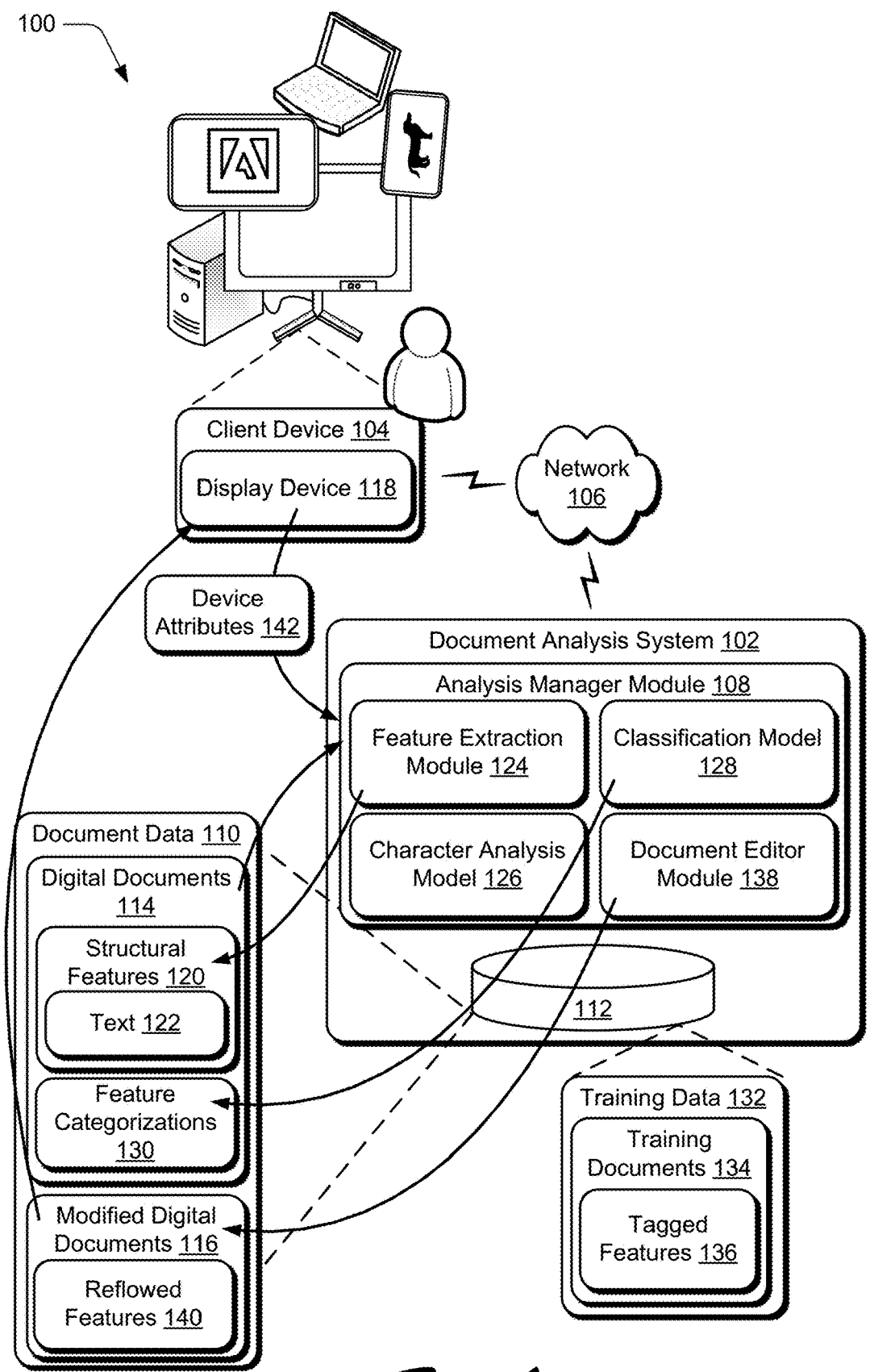
FIG. 1 is an illustration of an environment in an example implementation that is operable to employ techniques described herein.

To overcome the challenges to document feature classification presented in typical document analytics systems, classifying structural features of a digital document by feature type using machine learning is leveraged in a digital medium environment. For instance, to mitigate the challenge of a lack of training data for training a machine learning model to classify structural features of digital documents by feature type, the described document analysis system generates training data by utilizing tagged digital documents in which structural features of the digital documents are tagged with defined feature types. A character analysis model is then trained using the tagged digital documents to predict text characters in text content of digital documents, and to generate text vector representations of the text content. A classification model is trained using the tagged digital documents to take the text vectors and position information for structural features of the digital documents, and to output feature types for the structural features. Thus, utilizing the character analysis model and the classification model, accurate classifications of feature types for structural features of digital documents can be generated.

For instance, the described document analysis system receives a digital document for structural feature classification, such as an image-based digital document. Generally, the digital document includes various types of structural features, including text along with different unclassified structural features such as text blocks, Tillable form fields, selectable options, lists, list items, bullets and bulleted items, and so forth. A feature extraction module extracts the structural features from the digital document to obtain the text and the unclassified structural features, such as via an optical scan or other computer vision technique. For the unclassified structural features, the feature extraction module determines position information that describes a position of each of the structural features in the digital document. The position information, for example, includes coordinates and size information for each of the structural features relative to a page of the digital document from which the structural features are extracted.

The document analysis system then utilizes the extracted text and position information to initiate a process for classifying the unclassified structural features. To do this, the text is input to the character analysis model, which outputs text vector representations of text from each of the structural features. The character analysis model, for instance, converts the text content into numerical text vectors that can be utilized in further processing. The text vectors are then combined with the position information for each of the structural features to generate feature vectors for each of the structural features, and the feature vectors are combined (e.g., concatenated) to generate a vector sequence that includes feature vectors for the digital document.

To generate feature type classifications for the unclassified structural features of the digital document, the vector sequence is input to the trained classification model, which processes the vector sequence to classify each of the unclassified structural features according to a respective feature type. The classification model, for instance, leverages a context determination model that determines a context of each of the structural features relative to the digital document as a whole. Generally, the context determination model is trained as part of training the classification model to determine different contexts of structural features based on their respective positions and content. Accordingly, the context determination model outputs context vectors for each of the structural features and a decoder model decodes the context vectors to generate feature type classifications for each of the structural features of the digital document. The decoder model, for instance, classifies each of the structural features into a feature type category.

In at least some implementations, the classified structural features are utilized to generate a modified version of the digital document. For instance, by knowing the feature type for each of the structural features, a document editor module reformats the digital document to generate different versions of the digital document while preserving a semantic context of the structural features. Generally, the "semantic context" of a structural features refers to a logical and/or visual context of a structural feature in relation to a digital document as a whole. For instance, by preserving the semantic context of structural features of a digital document when the digital document is modified, techniques described herein enable the logical and visual integrity of the structural features to be preserved in modified versions of the digital document.

Accordingly, techniques for classifying structural features of a digital document by feature type using machine learning overcome the deficiencies of traditional ways for digital document analysis. For instance, the innovative techniques accurately classify feature types for structural features of digital documents without requiring user intervention to specify or validate the identified feature types. Further, based on the classified feature types, modifiable versions of digital documents can be generated that enable semantic contexts of structural features to be preserved. In this way, accurate classification of feature types for structural features of digital documents can be leveraged to reduce inaccuracies and resource wastage experienced in conventional document analysis systems.

Term Descriptions

These term descriptions are provided for purposes of example only and are not intended to be construed as limiting on the scope of the claims.

As used herein, the term "digital document" refers to digital collections of digital content, such as digital text and digital images. Examples of digital documents include Portable Document Format (PDF) documents, editable digital text documents, digital image documents (e.g., Tagged Image File Format (TIFF) files), and so forth. In at least some implementations, a digital document is implemented as an image-based digital document that does not include editable text or other editable visual features.

As used herein, the term "structural feature" refers to visual elements of digital documents, such as visual structures that make up a digital document. Generally, a particular digital document can be characterized as a set of structural features that are arranged in a particular way to generate the visual appearance of the particular digital document. Examples of structural features include text blocks, fillable form fields, selectable options, lists, list items, bullets and bulleted items, and so forth.

As used herein, the term "feature type" refers to ways in which structural features can be categorized based on their type. For instance, different categories of structural features can be defined and used to categorize instances of structural features of digital documents. Generally, by categorizing structural features into different feature types, the semantic context of structural features can be preserved when digital documents are modified. Examples of feature types and include a text block, a fillable form field, a selectable option, a list, a list item, a bullet, a bulleted item, and so forth.

As used herein, the term "semantic context" refers to the logical and/or visual context of a structural feature. For instance, different types of structural features in a digital document have different semantic contexts that pertain to how the structural features relate to the digital document as a whole. As one example, a structural feature categorized as a "list item" has the semantic context of being an item in a list of items. By classifying structural features of a digital document by feature type using machine learning, the techniques described herein preserve the semantic context of structural features of a digital document when the digital document is modified. For example, when a digital document that includes a list with list items is modified, the semantic context of the list and its list items is preserved in the modified version of the digital document.

As used herein, the terms "classify" and "classifying" refers to a computer-executed function (e.g., a computer-executed process and/or action) of assigning and/or categorizing a structural feature of a digital document into a defined category of feature type, examples of which are discussed above. For instance, the classification model detailed herein takes a vector sequence for a structural feature of a digital document as input, and processes the vector sequence to determine a document context for the structural feature. The document context, for example, represents a logical and/or visual relationship of the structural feature to the digital document, such as a position of the structural feature within the digital document, a type of content included in the structural feature (e.g., text and/or other visual elements), a size of the structural feature, and so forth. Based on the document context, the classification model classifies the structural feature by correlating the structural feature with a particular feature type, and by tagging the structural feature with identifying data that identifies the structural feature as an instance of the particular feature type.

Otherwise stated, the classification of structural features discussed herein leverages a machine learning system trained using a discrete set of pre-defined feature types of structural features. The machine learning system, for instance, is trained to classify an unclassified structural feature of a digital document by recognizing a context of the unclassified structural feature relative to the digital document, and mapping the unclassified structural feature to one of the pre-defined feature types based on the context of the structural feature. In at least one implementation, the machine learning system can map the unclassified structural feature to a pre-defined feature type by generating probability values that each specify a probability that the unclassified structural feature matches a different respective pre-defined feature type, and selecting the feature type with the highest probability as the classification for the structural feature. The machine learning system then applies a digital label to the structural feature that identifies the structural feature as an instance of the particular feature type. As described herein, the labeled structural feature may be utilized to generate a modified version of the digital document that maintains a semantic context of the structural feature in the modified version.

In at least some implementations, the classification of structural features discussed herein is implemented using recurrent neural network (RNN) techniques, such as a long short-term memory (LSTM) machine learning model that not only classifies individual structural features of digital document by feature type, but utilizes information about previously-classified structural features in the digital document to inform subsequent classifications of structural features. For instance, when classifying a particular structural feature of a digital document, the LSTM model takes as input context data for the particular structural feature as well as a feature type classification for a previously-classified structural feature of the digital document. Thus, the classification of structural features described herein is "context aware" to not only the context of individual structural features, but to the context of the aggregate structural features of a digital document. Generally, this provides for greater accuracy in the classification of structural features of digital documents than is provided by typical document analytics systems.

In the following discussion, an example environment is first described that may employ the techniques described herein. Example systems and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may implement the various techniques described herein.

Example Environment

FIG. 1 is an illustration of an environment 100 in an example implementation that is operable to employ classifying structural features of a digital document by feature type using machine learning as described herein. The illustrated environment 100 includes a document analysis system 102 and a client device 104 that are communicatively coupled, one to another, via a network 106.

Computing devices that are usable to implement the document analysis system 102 and the client device 104 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 13.

The document analysis system 102 includes an analysis manager module 108 that is representative of functionality to analyze and categorize structural features of digital documents further to techniques for classifying structural features of a digital document by feature type using machine learning described herein. As part of enabling the analysis manager module 108 to perform such analyses and categorization, the document analysis system 102 maintains document data 110 in a storage 112. The document data 110 generally represents various attributes of digital documents and includes digital documents 114 and modified digital documents ("modified documents") 116. The digital documents 114 generally represent different instances of electronic digital content that can be output in various ways and in various forms, such as via display on a display device 118 of the client device 104. Examples of the digital documents 114 include digital forms, digital publications, digital text documents, web content (e.g., web pages), and so forth. In at least some implementations, the digital documents 114 include image-based digital documents, such as PDF documents. An image-based digital document, for example, represents a digital document with content encoded as images, in contrast with other types of digital documents that may include machine-encoded text and other types of machine-encoded content. In at least one implementation, a digital document 114 represents an electronic document consisting of images only without any machine-encoded text or other editable graphics.

The digital documents 114 include structural features 120, with some of the structural features including text 122. The structural features 120 represent visual elements of digital documents 114, such as visual structures that make up a digital document 114. Generally, a particular digital document 114 can be characterized as a set of structural features 120 that are arranged in a particular way to generate the visual appearance of the particular digital document 114. Examples of the structural features 120 include text blocks, fillable form fields, selectable options, lists, list items, bullets and bulleted items, and so forth. The text 122 includes representations of text characters, such as words, phrases, sections of text, and so forth. In an implementation where a digital document 114 is an image-based document, the text 122 is implemented as an image of text characters, i.e., the text 122 is not machine-encoded text.

The analysis manager module 108 further includes a feature extraction module 124, a character analysis model 126, and a classification model 128. The feature extraction module 124 is representative of functionality to analyze and extract different features of the digital documents 114, such as the structural features 120. In at least one implementation, the feature extraction module 124 utilizes computer vision processes to analyze and extract the structural features 120 from the digital documents 114. The character analysis model 126 and the classification model 128 represent different machine learning models that take the structural features 120 as input, and generate feature categorizations 130 that classify individual structural features 120 into different pre-defined categories of features. Implementations of the character analysis model 126 and the classification model 128 are detailed below.

To enable the character analysis model 126 and the classification model 128 to generate the feature categorizations 130, the document analysis system 102 maintains training data 132 stored on the storage 112. Generally, the training data 132 can be utilized by the analysis manager module 108 to train the character analysis model 126 and the classification model 128 prior to processing the structural features 120. The training data 132, for instance, includes training digital documents ("training documents") 134, which include tagged structural features ("tagged features") 136. The tagged features 136, for instance, are generated by processing (e.g., manually) the digital documents 114 and applying tags to the tagged features 136 that identify which category each tagged feature 136 belongs to. The tagged features 136 can then be used to train the character analysis model 126 and the classification model 128 to categorize the structural features 120.

Further to techniques for classifying structural features of a digital document by feature type using machine learning, the document analysis system 102 includes a document editor module 138 that can process the digital documents 114 to generate the modified digital documents 116. The document editor module 138, for instance, utilizes the feature categorizations 130 to determine feature types for each of the structural features 120, and to generate reflowed structural features ("reflowed features") 140 as part of the modified documents 116. The reflowed features 140, for instance, represent instances of the structural features 120 that are visually rearranged from the digital documents 114 to generate the modified documents 116. Generally, by utilizing the feature categorizations 130, the document editor module 138 can ensure that the structural features 120 are appropriately placed as the reflowed features 140 to generate the modified documents 116.

In at least one implementation, a reformatted digital document 114 is generated to be adapted for display on a display device 118 of the client device 104. For instance, consider that a particular digital document 114 is originally generated for display on a large form factor display, such as a desktop computer display. Consider further that the display device 118 is a small form factor display, such as a mobile phone. Accordingly, the document editor module 138 can receive device attributes 142 from the client device 104 that indicate attributes of the display device 118. The device attributes 142, for instance, represent data that describes different attributes of the display device 118, such as display size, aspect ratio, resolution, display technology, make and model, and so forth. The document editor module 138 can then utilize the device attributes 142 to generate a reformatted document 114 that is formatted for display on the display device 118. Generating the reformatted document 114, for instance, involves manipulating various attributes of a set of structural features of a particular digital document 114 to generate the reflowed features 140 for the reformatted document 114. Generally, this enables the reformatted document 114 to be properly displayed on the display device 118.

According to implementations for classifying structural features of a digital document by feature type using machine learning, the analysis manager module 108 can configure the character analysis model 126 and the classification model 128 using any type of machine-learning technique to enable classification of structural feature categories as described herein. Further, such a machine-learning model uses one or more of supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, or combinations thereof.

Having considered an example environment, consider now a discussion of some example details of the techniques for classifying structural features of a digital document by feature type using machine learning in a digital medium environment in accordance with one or more implementations.

Implementation Scenarios

Figure 2:
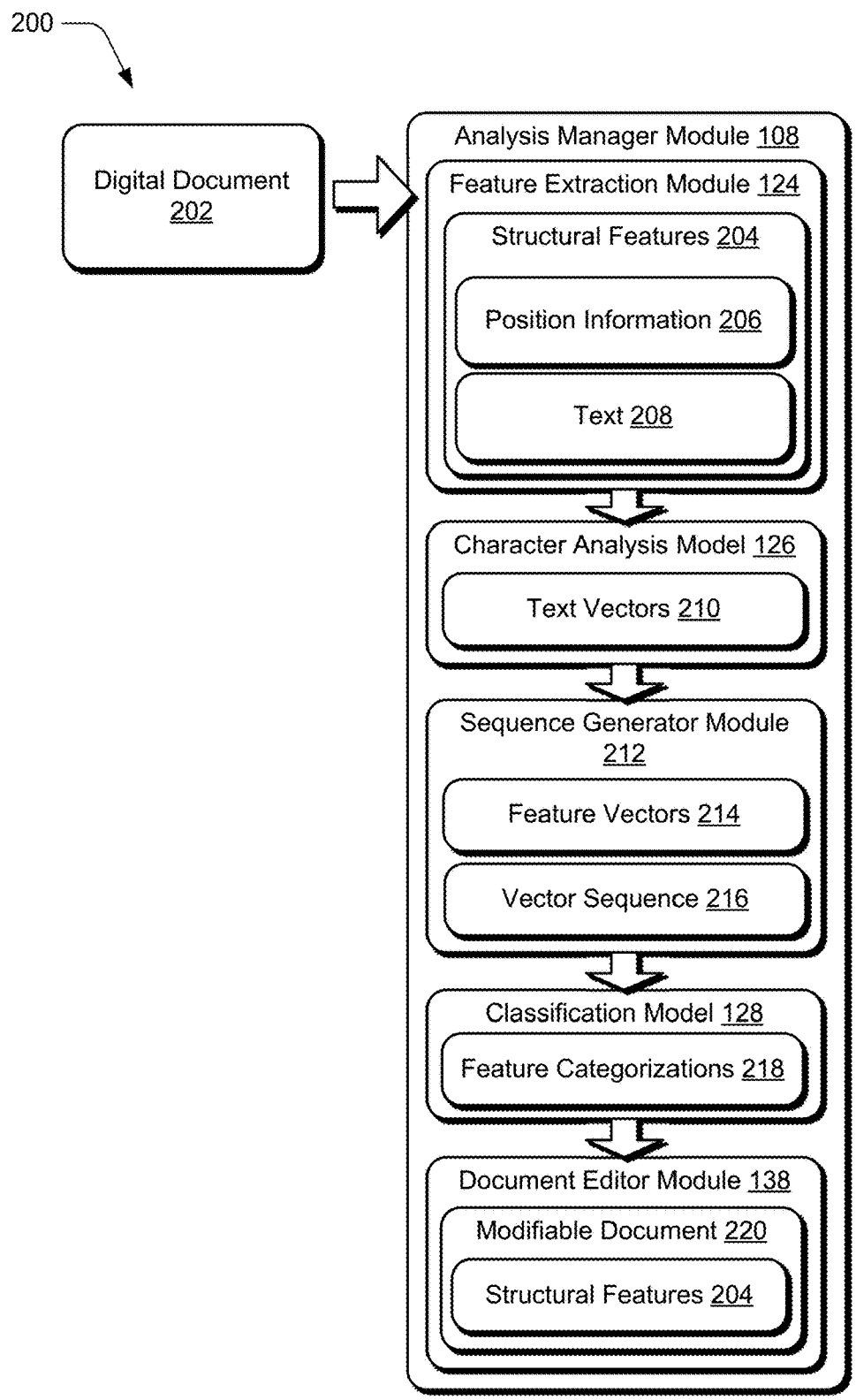
FIG. 2 depicts an example system that represents an overview of processes for classifying structural features of a digital document by feature type using machine learning.

FIG. 2 depicts an example system 200 that represents an overview of processes for classifying structural features of a digital document by feature type using machine learning in accordance with various implementations. More detailed discussions of individual aspects of the system 200 are presented after discussion of the system 200. In the system 200, the analysis manager module 108 receives a digital document 202, which generally represents an instance of the digital documents 114. The feature extraction module 124 processes the digital document 202 to extract structural features 204 from the digital document 202. As referenced above, the feature extraction module 124 can utilize computer vision techniques to analyze visual aspects of the digital document 202 and extract the structural features 204.

In this example system, extracting the structural features 204 generates position information 206 and text 208. The position information 206 identifies locations of individual structural features on a page of the digital document 202. For instance, when the feature extraction module 124 identifies a particular structural feature 204 on a page of the digital document 202, the feature extraction module 124 utilizes a bounding box to enclose the particular structural feature 204 and separate it from other structural features 204. Thus, the position information 206 describes attributes of the bounding box, such as spatial coordinates of the bounding box. In at least one implementation, the spatial coordinates are described with reference to the geometry of a page of the digital document 202 from which the particular structural feature 204 is extracted. For instance, for the bounding box of the particular structural feature 204, the position information 206 includes an x-coordinate and a y-coordinate for an upper left corner of the bounding box and with reference to the upper left corner of the page of the digital document 202. Further, the position information 206 includes a width and a height of the bounding box, such as in pixels and/or distance measurement, e.g., dots per inch (dpi), millimeters (mm), and so forth. Thus, in such implementations, the position information 206 includes these coordinates for each of the structural features 204.

At least some of the structural features 204 also include the text 208. The feature extraction module 124, for instance, utilizes optical character recognition (OCR) to extract the text 208 from the digital document 202. Generally, for those structural features 204 that include text, the text will typically be contained within respective bounding boxes of the structural features 204.

To enable the structural features 204 to be categorized, vector representations of the structural features 204 can be generated. Accordingly, the character analysis model 126 takes the text 208 for each of the structural features 204 as input, and generates text vectors 210 from the text 208 for each of the features 204. Generally, the text vectors 210 are implemented as numerical representations of the text 208. Example ways for generating the text vectors 210 are detailed below, such as with reference to FIG. 7.

The text vectors 210 and the position information 206 are then passed to a sequence generator module 212, which generates feature vectors 214 using the text vectors 210 and the position information 206. In at least some implementations, the position information 206 is generated by the feature extraction module 124 as numerical vectors (e.g., the spatial information described above), and thus is combinable with the text vectors 210 to generate the feature vectors 214. For instance, consider that the text vectors 210 are each represented as a vector $v_t$ for each of the structural features 204, and the position information 206 is represented as a vector $v_s$ for each of the structural features 204. Accordingly, in at least one implementation, the sequence generator module 212 can generate a feature vector 214 for each of the structural features 204 by concatenating the text vector 210 and the position information 206 for each of the structural features 204 to generate a feature vector $v_c$ for each of the structural features 204. This is indicated via the following representation:

For each structural feature 204, a feature vector 214 $v_c=[v_t,v_s]$

After generating a feature vector 214 for each of the structural features 204, the sequence generator module 212 generates a vector sequence 216 using the feature vectors 214. In at least one implementation, to generate the vector sequence 216, the sequence generator module 212 concatenates the feature vectors 214 based on the position of their respective structural features 204 in the digital document 202. For instance, after obtaining a feature vector 214 corresponding to each structural feature 204 in a page of the digital document 202, the sequence generator module 212 geographically sorts the structural features 204, first vertically from top-down in the page. The sequence generator module 212 then picks a first structural feature 204, and considers all the elements (e.g., pixels) which lie vertically within the height range of its bounding box and sorts them horizontally leaving the remaining sequence of elements for other structural features 204 undisturbed. The sequence generator module 212 repeats this process for the elements in the remaining set structural features 204. In this way, the sequence generator module 212 sorts the structural features 204 and their corresponding elements vertically top-bottom and then horizontally in left-right manner in reference to a page of the digital document 202. This arranges the elements in natural reading order, e.g., left-to-right and top-to-bottom according to some written language reading orders. The sequence generator module 212 thus obtains the vector sequence 216 $S=v_{c1}, v_{c2}, v_{c3}, \ldots v_{cn}$ as a result of the sorting operation with n being number of structural features in a page.

Further to the system 200, the vector sequence 216 is input to the classification model 128, and the classification model 128 generates feature categorizations 218 for the structural features 204. The feature categorizations 218, for instance, specify a category of structural feature for individual structural features 204. Details of how the classification model 128 generates the feature categorizations 218 are presented below, such as with reference to FIG. 9. Generally, the feature categorizations 218 are usable for various purposes, such as identifying different attributes of digital documents, reformatting digital documents, searching digital documents for different structural features, and so forth.

For instance, the document editor module 138 receives the feature categorizations 218 and generates a modifiable digital document ("modifiable document") 220 based on the feature categorizations. The modifiable document 220 includes the structural features 204 and is modifiable to enable the structural features 204 to be modified relative to the modifiable document 220 in various ways. For instance, the structural features 204 can be moved to different positions in the modifiable document 220, such as different positions on a particular page, and/or between different pages of the modifiable document 220. According to various implementations, knowing the feature categorizations 218 for the structural features 204 enables the document editor module 138 to preserve a semantic context of the structural features 204 when a particular structural feature 204 is manipulated relative to the modifiable document 220. For instance, when a particular structural feature 204 is modified, characteristics specific to its feature categorization can be preserved across the modification, thus enabling the structural feature 204 to maintain its semantic context.

Figure 3:
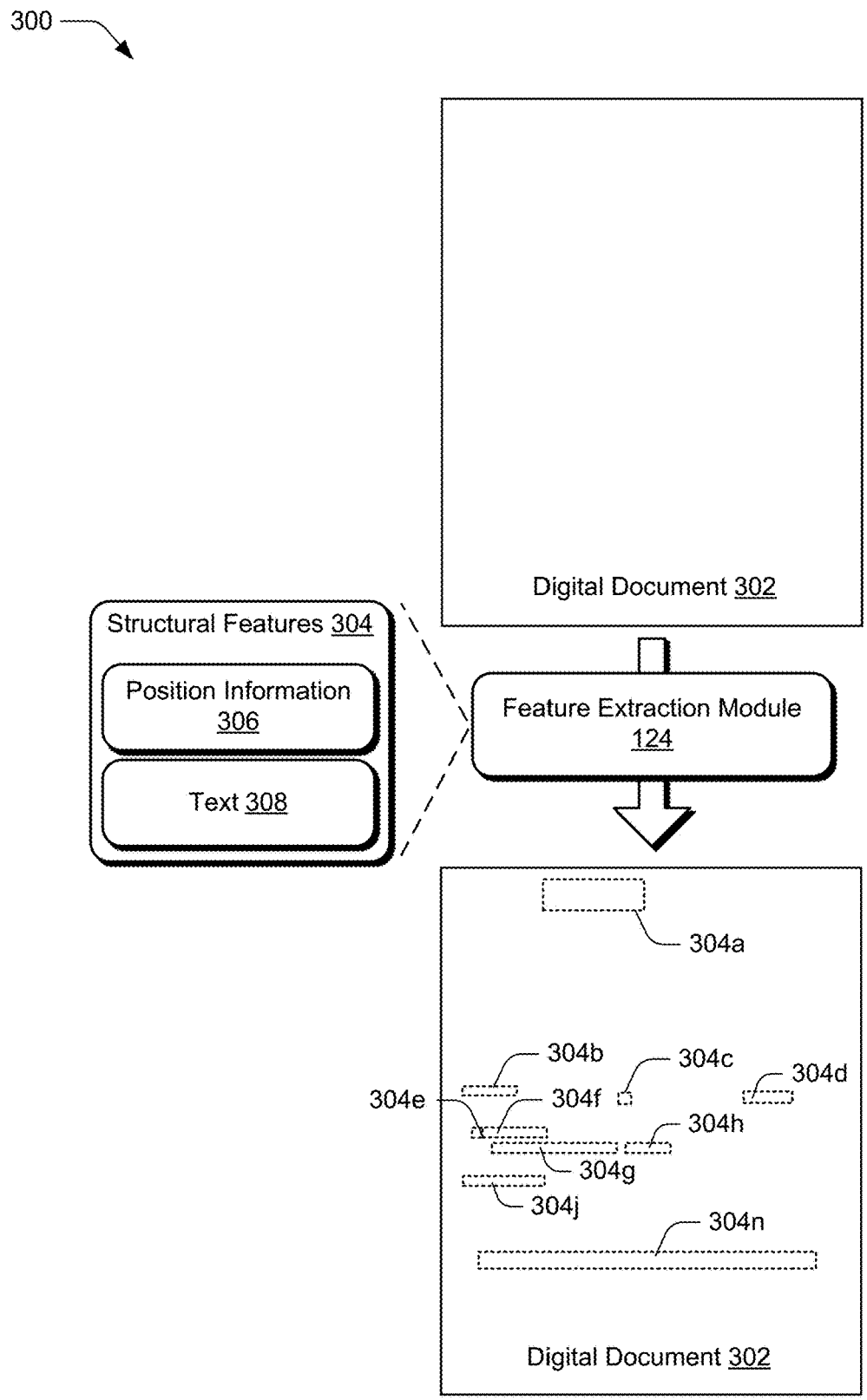
FIG. 3 depicts an example system that describes a way for extracting features from a digital document to identify structural features that can then be categorized.

FIG. 3 depicts an example system 300 that describes a way for extracting features from a digital document to identify structural features that can then be categorized. In the system 300, a digital document 302 is input into the feature extraction module 124. Accordingly, the feature extraction module 124 extracts structural features 304 from the digital document 302 including position information 306 and for at least some of the structural features, text 308.

The lower portion of the system 300 shows the digital document 302 with the structural features 304 outlined by their respective bounding boxes, depicted using dashed lines. Generally, the bounding boxes are not typically visible when the digital document 302 is displayed, but represent a data representation of a defined perimeter of the respective structural features 304. This is not intended to be limiting, however, and at least some implementations may involve a visible bounding box that is displayed as part of the digital document 302.

In this particular example, the structural features 304 include structural features 304a, 304b, 304c, 304d, 304e, 304f, 304g, 304h, 304j, and 304n. This number and positions of structural features are presented for purposes of example only, and it is to be appreciated that digital documents processed according to techniques for classifying structural features of a digital document by feature type using machine learning can include any number and position of structural features.

Figure 4:
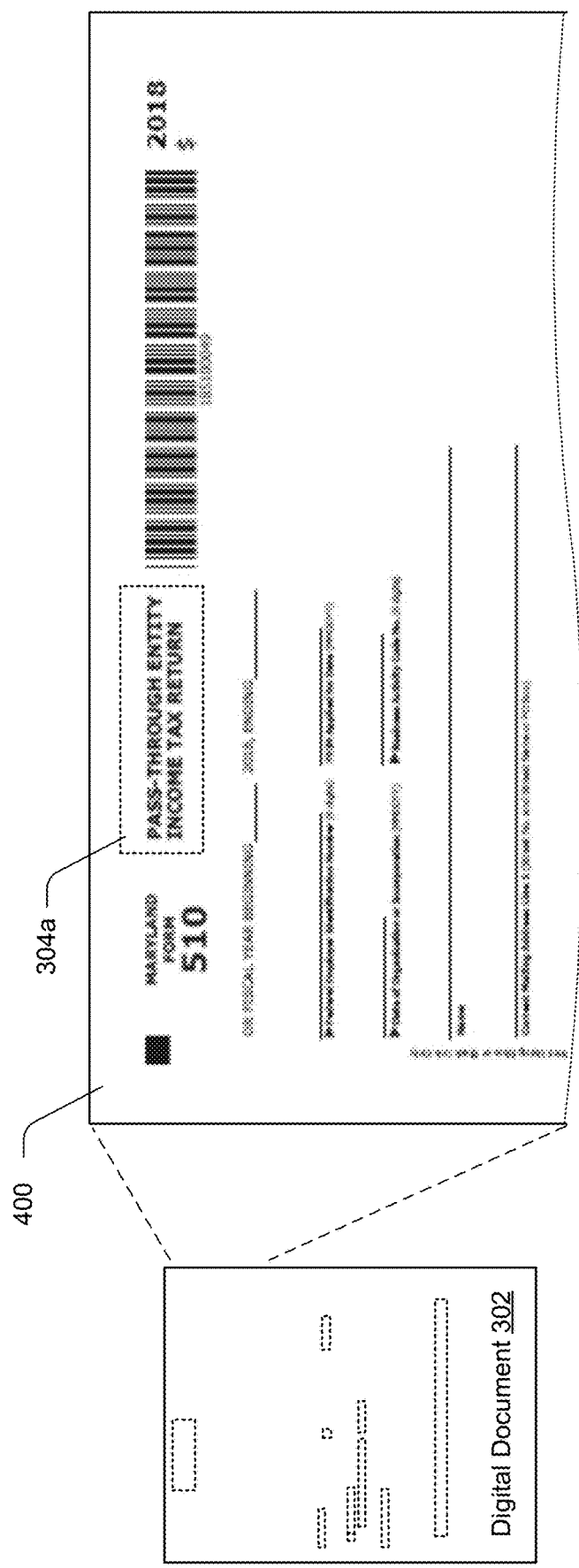
FIG. 4 illustrates a portion of a digital document including a particular structural feature.
Figure 5:
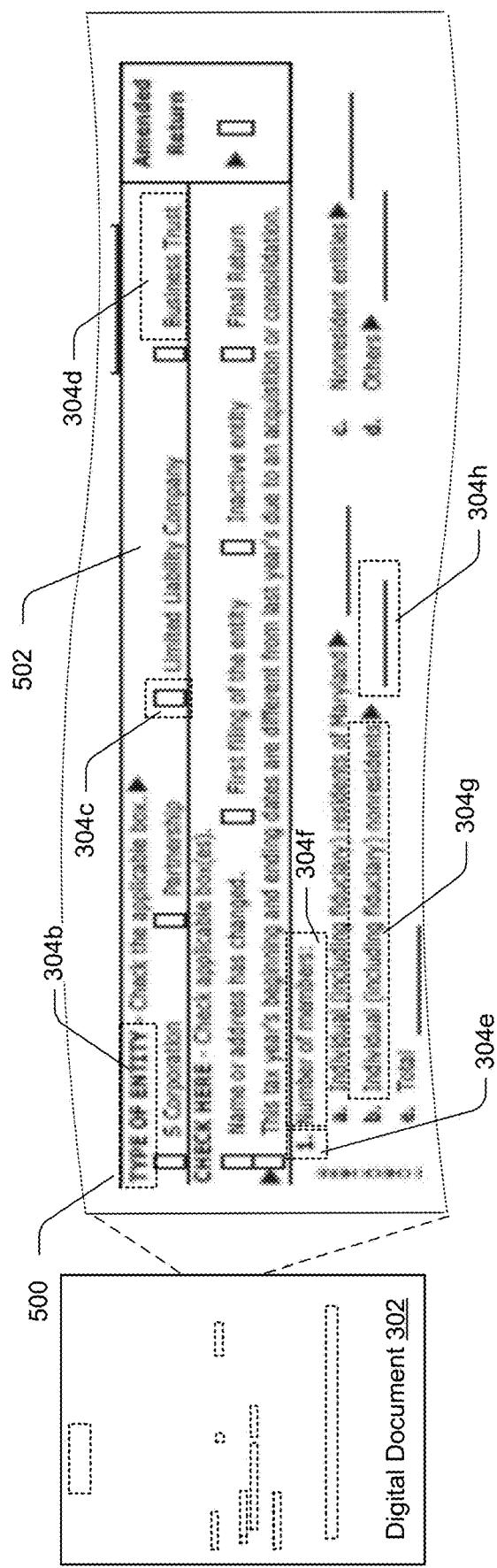
FIG. 5 illustrates a portion of a digital document including a number of different structural features.
Figure 6:
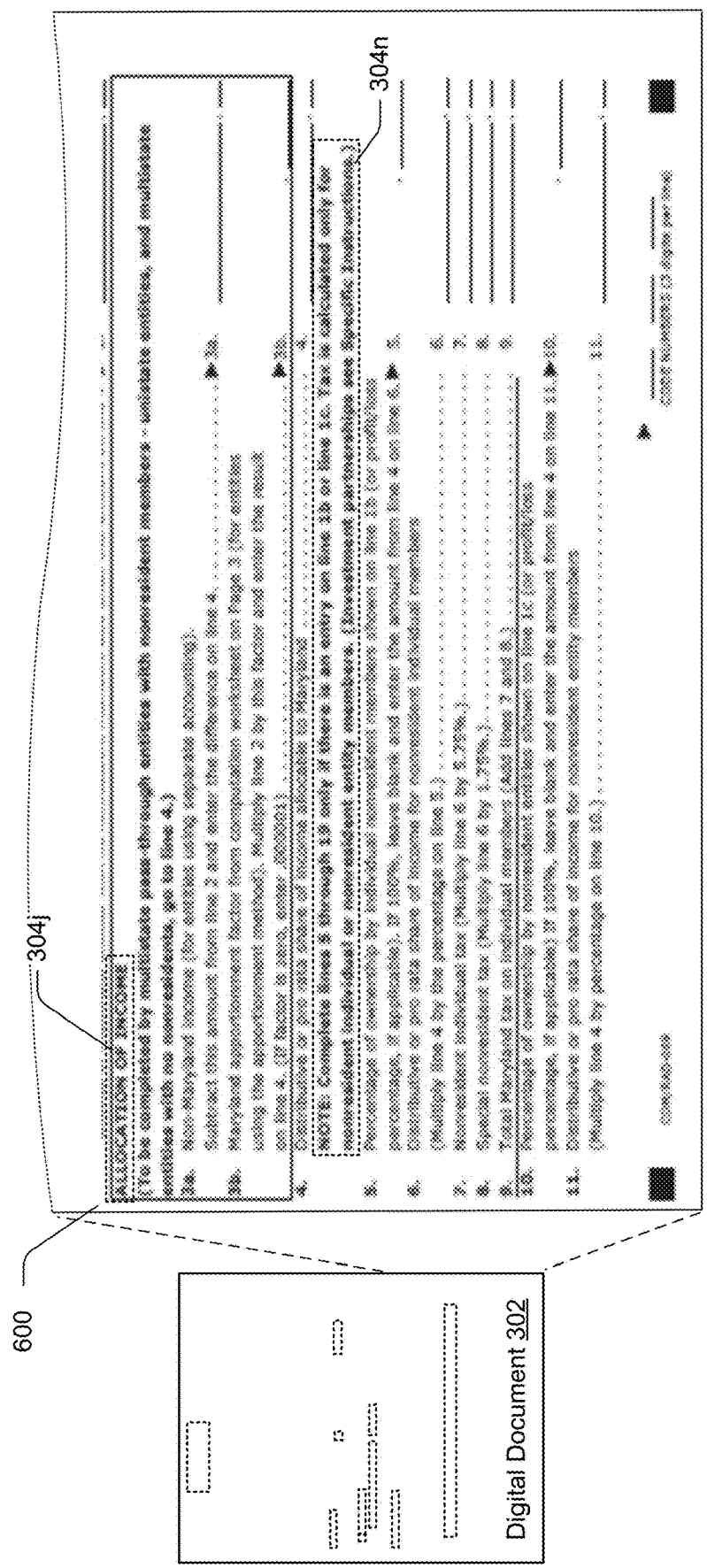
FIG. 6 illustrates a portion of a digital document including a number of different structural features.

FIGS. 4-6 illustrate the structural features 304a-304n in more detail. For instance, FIG. 4 illustrates a portion 400 of the digital document 302 including the structural feature 304a. In this example, the structural feature 304a represents a header title of the digital document 302, which is a particular category of structural features according to techniques for classifying structural features of a digital document by feature type using machine learning. As illustrated, the structural feature 304a is defined by a bounding box around the structural feature 304a (shown as a dashed line), as well as text within the bounding box.

FIG. 5 illustrates a portion 500 of the digital document 302 including a number of different structural features 304, including:

Structural Feature 304b—this structural feature represents a choice group title for a choice group 502, which includes a text block which describes general guidelines such as how to fill in a set of choices and/or an overall descriptive summary of what a choice group 502 is about. The structural feature 304b is shown surrounded by a bounding box, and includes text content.

Structural Feature 304c—this structural feature represents a choice widget, which is selectable to select an associated choice from the choice group 502. As illustrated, the structural feature 304c does not include text content, so for purposes of processing described herein, the structural feature 304c is represented by a zero text vector.

Structural Feature 304d—this structural feature represents a choice field caption that describes a selectable option from the choice group 502. The structural feature 304d includes text content as outlined by a bounding box that describes the perimeter of the structural feature 304d.

Structural Feature 304e—this structural feature represents a list bullet that represents a typographical symbol or glyph used to introduce items in a list.

Structural Feature 304f—this structural feature represents a list item in a list and includes text content.

Structural Feature 304g—this structural feature represents a text field caption with text that describes information to be filled by a user into a text widget.

Structural Feature 304h—this structural feature represents a text widget that can receive user input of information described by a text field caption. As illustrated, the structural feature 304h does not include text content, so for purposes of processing described herein, the structural feature 304h is represented as a zero text vector.

FIG. 6 illustrates a portion 600 of the digital document 302 including a number of different structural features 304, including:

Structural Feature 304j—this structural feature represents a section title for a section of text of the digital document 302.

Structural Feature 304n—this structural feature represents static text, which is representative of portions of text not categorized into one of the other categories of structural features described above.

Accordingly, structural features of a digital document can be categorized into one of the categories of feature types described above. These categories are presented for purposes of example only, and it is to be appreciated that any number and type of structural features can be defined and utilized to categorize portions of a digital document. Generally, the digital document 302 represents a digital document that can be utilized as part of training the character analysis model 126 and the classification model 128, or a digital document input into the models for classification. In a scenario where the digital document 302 is utilized as a training document 134, the different structural features described above will be tagged with their respective categorizations to generate the tagged features 136 before being input into the respective models for training the models.

Figure 7:
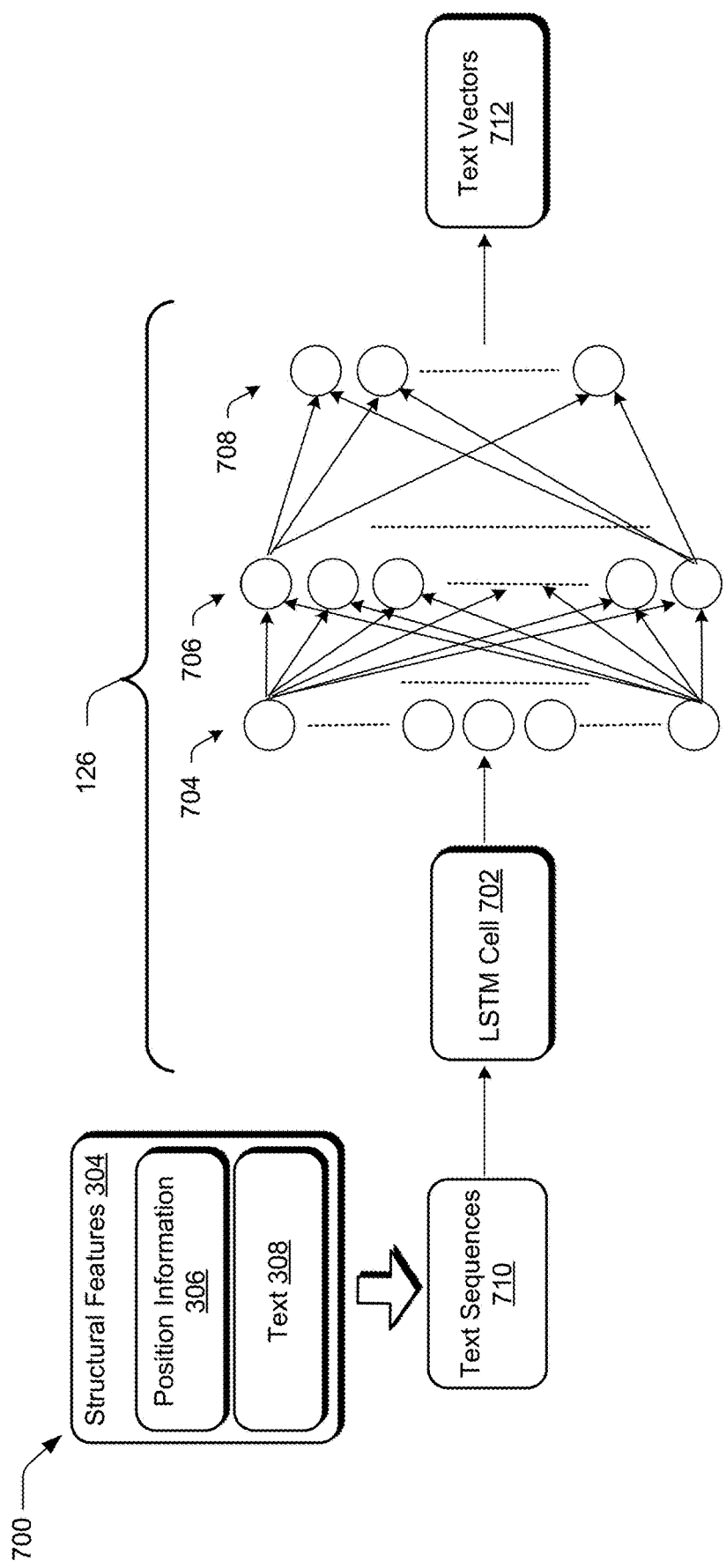
FIG. 7 depicts an example system for obtaining text vectors using a character analysis model.

FIG. 7 depicts an example system 700 for obtaining text vectors using the character analysis model 126. In this particular example, the character analysis model 126 includes an LSTM cell 702, an LSTM output embedding layer 704, intermediate embedding layer 706, and an output layer 708. In order to generate vector embeddings from the text 308, the character analysis model 126 sequentially processes the characters present in the input text. For instance, for the text 308 from each of the structural features 304, the character analysis model 126 processes text sequences 710 (e.g., sequences of text inputs of arbitrary length) to obtain a representation which captures and incorporates long term dependencies within the text sequences 710. Once the LSTM cell 702 processes the sequences of characters present in each of the input text sequences 710, its output from the output embedding layer 704 is fed as input to the intermediate embedding layer 706 (e.g., a fully connected layer) followed by the output layer 708 (e.g., another fully connected layer), which outputs text vectors 712. Generally, the text vectors 712 include individual text vectors for text 308 from each of the structure features 304. In at least some implementations, the output layer 708 utilizes softmax activation to normalize the text vectors 712.

Generally, this architecture is trained to predict the next character in a text sequence based on the sequence of characters received as input. Accordingly, the parameters of the LSTM cell 702 are trained so that they understand the input text sequence at a character level since the LSTM unit maintains the context and generates a hidden representation which is used by the neural architecture that follows it (e.g., the intermediate embedding layer 706 and the output layer 708) for predicting the next character in a text sequence 710. According to various implementations, text block data from tagged training documents 134 is used to train the character analysis model 126 by splitting text in a text block arbitrarily such that the character analysis model 126 is trained to predict a next character given the sequence of characters before the split as input.

Accordingly, to generate vector representation of a text sequence 710 (e.g., a text block) of a digital document, the text is fed as a sequence of text characters into the character analysis model 126 described above and the output of the LSTM is extracted and used as the embedding representing the input text. In certain implementations where text content is obtained via OCR on a document image, the text may have mistakes such as character mutation. For example, an OCR process might read 'p' as 'a', 'l' as 'i', and so forth. To take this into account, the training data 132 is mutated probabilistically so that the embeddings obtained from the trained character analysis model 126 are robust to such alterations at classification time.

In one particular implementation, after experimentation with different architectures in terms of number of hidden units in the LSTM and fully connected layers, a dimension of 500 units was found to be optimal, such as based on performance measures such as accuracy and perplexity. Perplexity, for instance, is a measure of closeness between an output of the character analysis model 126 and an actual set of text content on which the character analysis model 126 is validated in terms of probability distribution over character outputs. Generally, the lower the perplexity, the more accurate the embedding generated by the character analysis model 126. As mentioned above, the character analysis model 126 can be implemented using a dimension of 500 units. In such implementations, given the input text sequences 710, the character analysis model 126 outputs each of the text vectors 712 as 500 dimensional vector embedding representing each of the text sequences 710.

Figure 8:
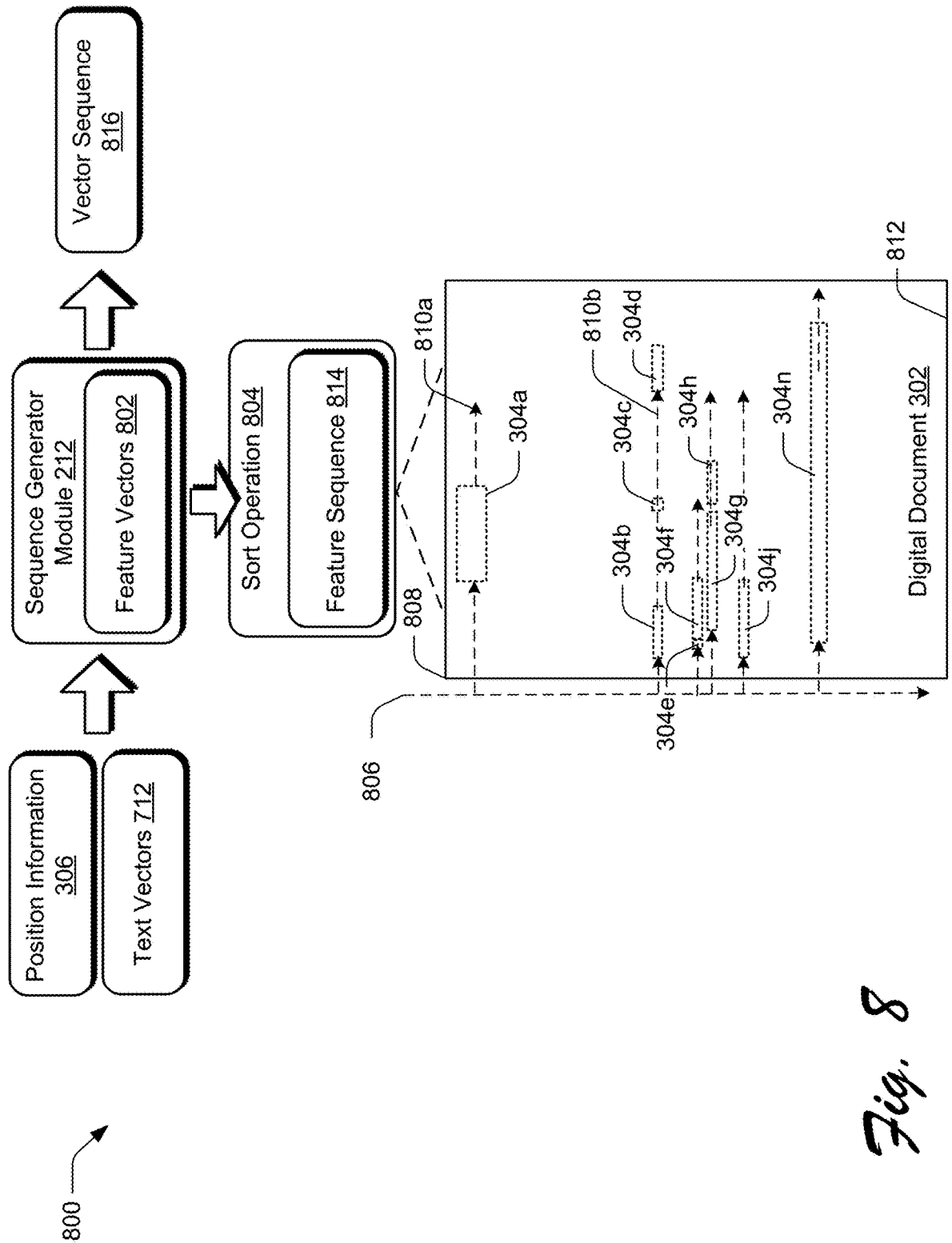
FIG. 8 depicts a system for preprocessing vectors prior to classifying a set of structural features by feature type.

FIG. 8 depicts a system 800 for preprocessing vectors prior to classifying feature types for a set of structural features. In the system 800, the sequence generator module 212 processes the text vectors 712 and the position information 306 to generate feature vectors 802. For instance, similar to the system described with reference to FIG. 2, consider that the text vectors 712 are each represented as a vector $v_t$ for each of the structural features 304, and the position information 306 is represented as a vector $v_s$ for each of the structural features 304. Accordingly, in at least one implementation, the sequence generator module 212 can generate a feature vector 802 for each of the structural features 304 by concatenating a text vector 712 and the position information 306 for each of the structural features 304 to generate a feature vector $v_c$ for each of the structural features 304. This is indicated via the following representation:

For each structural feature 304, a feature vector
802 $v_c=[v_t,v_s]$

After generating $v_c$ for each of the structural features 304, the sequence generator module 212 performs a sort operation 804 that sorts the structural features 304 based on their relative positions in the digital document 302. The sorting operation 804 begins with a vertical sort 806 that starts at the top left edge 808 of the digital document 302 and searches downward vertically for the first structural feature 304. In this particular example, the structural feature 304a is first identified in the vertical sort 806. In response to locating the structural feature 304a, a horizontal sort 810a is performed that searches for other structural features within the digital document 302 horizontally within the height range of the bounding box of the structural feature 304a. No other structural features are found in this height range, so the vertical sort 806 continues and identifies the structural feature 304b. Based on the height range of the bounding box of the structural feature 304b, a horizontal sort 810b is performed that locates the structural features 304c, 304d. After this, the vertical sort 806 continues. Accordingly, the sorting operation 804 continues as generally described until the bottom 812 of the digital document 302 is reached. Thus, the structural features 304 are ordered based on the sorting operation 804. In this particular example, the sorting operation 804 results in a feature sequence 814 of structural features 304a, 304b, 304c, 304d, 304e, 304f, 304g, 304h, 304j, and 304n.

Based on the feature sequence 814, the sequence generator module 212 generates a vector sequence 816 using the feature vectors 802 for each of the respective structural features 304. For instance, the sequence generator module 212 concatenates the feature vectors 802 for the structural features 304 in the order specified by the feature sequence 814 to generate the vector sequence 816. For instance, consider that the vector sequence 816 is represented by $s_v$. Thus, for the structural features 304, the vector sequence 816 is generated as $S=v_{c1}, v_{c2}, v_{c3} \ldots v_{cn}$, which each $v_c$ representing a different feature vector 802 for a different respective structural feature 304.

Figure 9:
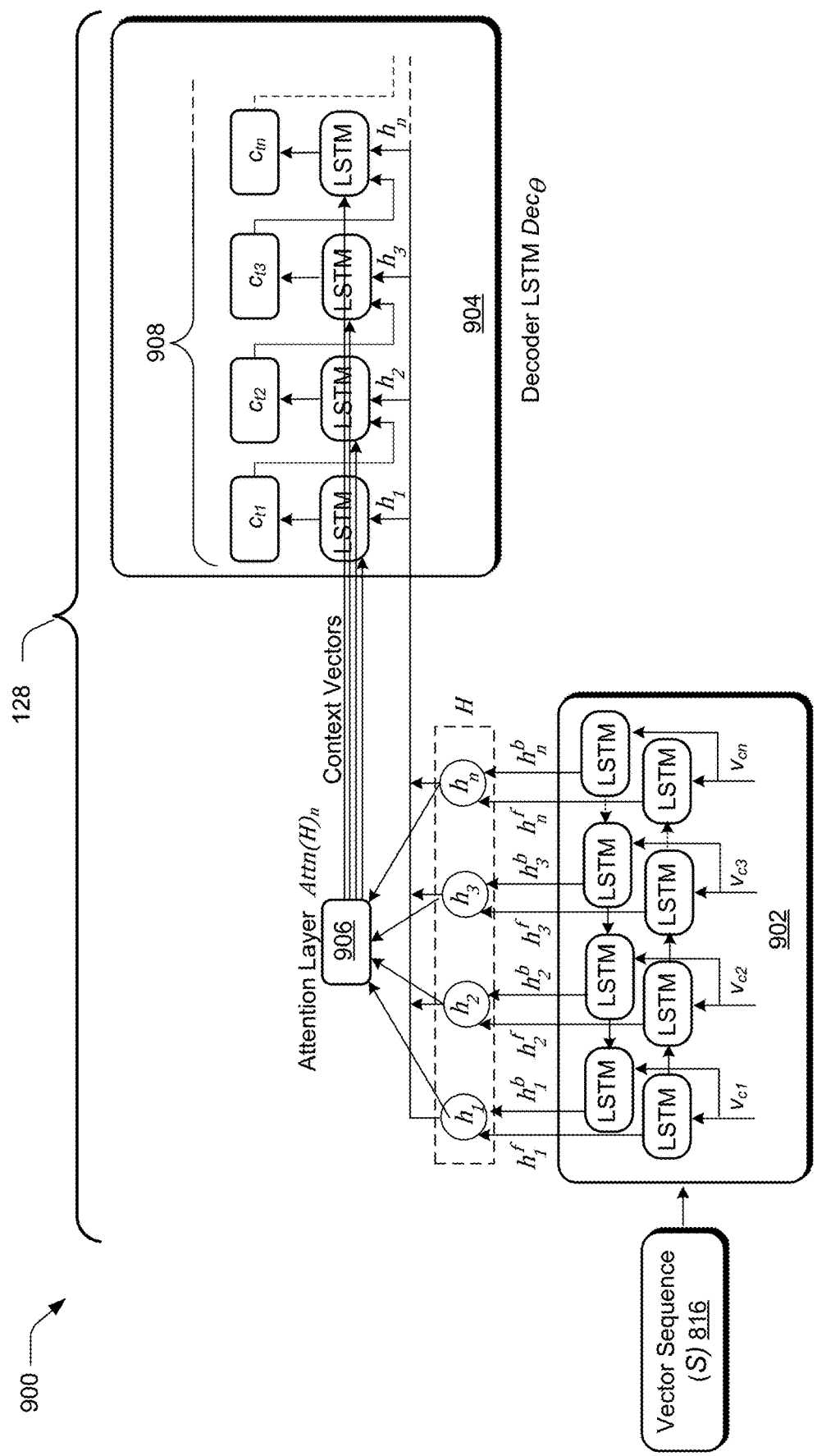
FIG. 9 depicts a system for classifying a set of structural features into different feature categories.

FIG. 9 depicts a system 900 for categorizing a set of structural features into different feature types. The system 900 includes the classification model 128, which in turn includes a context determination model 902, a decoder model 904, and an attention layer 906. In the system 900, the vector sequence 816 ("S") is input into the context determination model 902, which in this example represents a bidirectional LSTM. Thus, the context determination model 902 processes S in a similar manner as an LSTM and generates an output at each time step except it does this twice—once for the original sequence and a second time in a reverse order. The output at each time step in S is the concatenation of the outputs obtained at the corresponding time step while processing it in the two directions.

For instance, consider that j represents each structural feature in the digital document 302. Thus for each feature j, the context determination model 902 generates a context aware representation $h_j$ which not only takes into account information about structural features which appear before it in the sequence S but also takes into account information about structural features that occur subsequently in S. Hence, $h_j=[h_j^f,h_j^b]$, where j=1, 2, . . . n, with n=number of structural features on a page. f and b denote, respectively, outputs of the forward and backward LSTMs of the context determination model 902.

After the context determination model 902 processes each $v_{cj}$ and generates $h_j$ for each $v_{cj}$, each $h_j$ is input into the decoder model 904 which is represented by $Dec_\theta$. Generally, $Dec_\theta$ sequentially processes each $h_j$ with an output projection layer f to generate feature categorizations 908 for each structural feature. In this example, each individual feature categorization 908 is represented by a respective feature category type $c_t$ for each $h_j$. The size of f corresponds to a number of defined categories of structural features. For instance, based on the structural features 304, f=10. This is not construed to be limiting, however, and any number of categories of structural features can be defined and utilized. According to one or more implementations, softmax activation is used over the outputs of Dec$\theta$ to sequentially generate $c_t$ for each structural feature on a page of a digital document. In at least one implementation, each output category vector $c_t$ is modeled as a one-hot vector of size 10. The softmax vector generated by the projection layer f at each time step j during the decoding phase generally provides a probability distribution over different output classes for structural feature j. Thus, at each time step, the $c_t$ having a maximum probability is considered to be the classified category for a respective structural feature j.

During the sequential decoding, at each time step for each feature j, the decoder model 904 is given two inputs—$h_j$ and the predicted $c_t$ of the previous structural feature in the sequence. During training of the decoder model 904, this is the tagged output category while during classification of structural features, this is the output generated by the decoder model 904 itself. This enables the decoder model 904 to learn to condition later decisions on the outputs (e.g., the feature categorizations 908) it has already generated.

Further to processing using $h_j$ and $c_t$, the decoder model 904 attends on a memory $H=\{h_j\}$ utilizing the attention layer 906 and through an attention mechanism with each $h_j$ arranged along columns of a matrix H. In the attention layer 906, given a sequence of vectors $\{m_i\}$, attributed as memory M with vectors arranged along the columns of matrix M, the decoder model 904 learns a context vector derived using a weighted sum of columns of M as a function of its input and hidden state at each time step j (while decoding) and uses the context vector along with the other inputs for generating the feature categorizations 908. Thus, by attending on the attention layer 906, the decoder model 904 learns to identify and focus on specific parts of the memory through the context vectors while generating $c_t$ of each element in the sequence S. This enables the decoder model 904 to be aware of the entire digital document context at each step j while generating the output category $o_j$ (i.e., the feature categorization 908) of each element j. Thus, utilizing the attention layer 906 can be represented as:

$H=[h_1: h_2: , \ldots , : h_n]$, where ":" represents concatenation along columns of $H$ $p_j=\text{softmax}(f(Dec_\theta(o_{j-1}, h_j, \text{Attn}(H)_j))), j=1,2, \ldots n$ $o_j=\text{one-hot}(\arg\max_{\kappa \in \{1,2,\ldots n\}} p_j)$ Generally, this equation demonstrates that κ belongs to the set {1, 2, . . . , n} and κ is the argmax value and the one-hot operation gives a one-hot vector based on the value κ takes.

Accordingly, the aspects of the systems 800, 900 described above can be utilized for both training the character analysis model 126 and the classification model 128 using the labeled training documents 134, and for classifying structure features of unlabeled digital documents 114.

Figure 10:
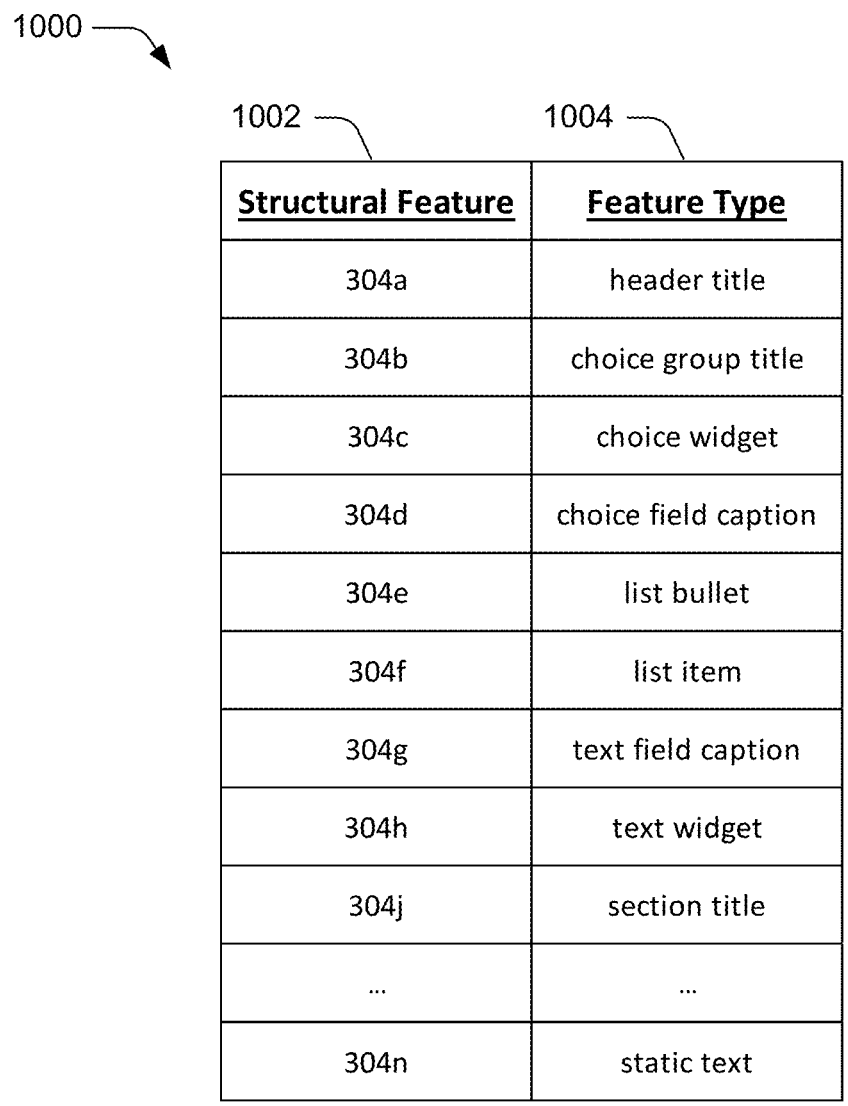
FIG. 10 illustrates a feature table that identifies classified feature categories for structural features of a digital document.

FIG. 10 illustrates a feature table 1000 that identifies feature categories for classified structural features of a digital document, such as described with reference to the systems 800, 900. The feature table 1000 includes a structural feature column 1002 and a feature type column 1004. The structural feature column 1002 identifies specific instances of structural features that are extracted from a digital document, such as the structural features 304 extracted from the digital document 302. The feature type column 1004 specifies the classified feature type for each structural feature identified in the structural feature column 1002. The feature types specified in the feature type column 1004, for instance, represent the instances of the feature categorizations 908 output by the decoder model 904, as detailed above.

Having discussed example details of the techniques for classifying structural features of a digital document by feature type using machine learning, consider now some example procedures to illustrate additional aspects of the techniques.

Example Procedures

This section describes example procedures for classifying structural features of a digital document by feature type using machine learning in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the document analysis system 102 of FIG. 1 that makes use of the analysis manager module 108 and using aspects described in the scenarios above.

Figure 11:
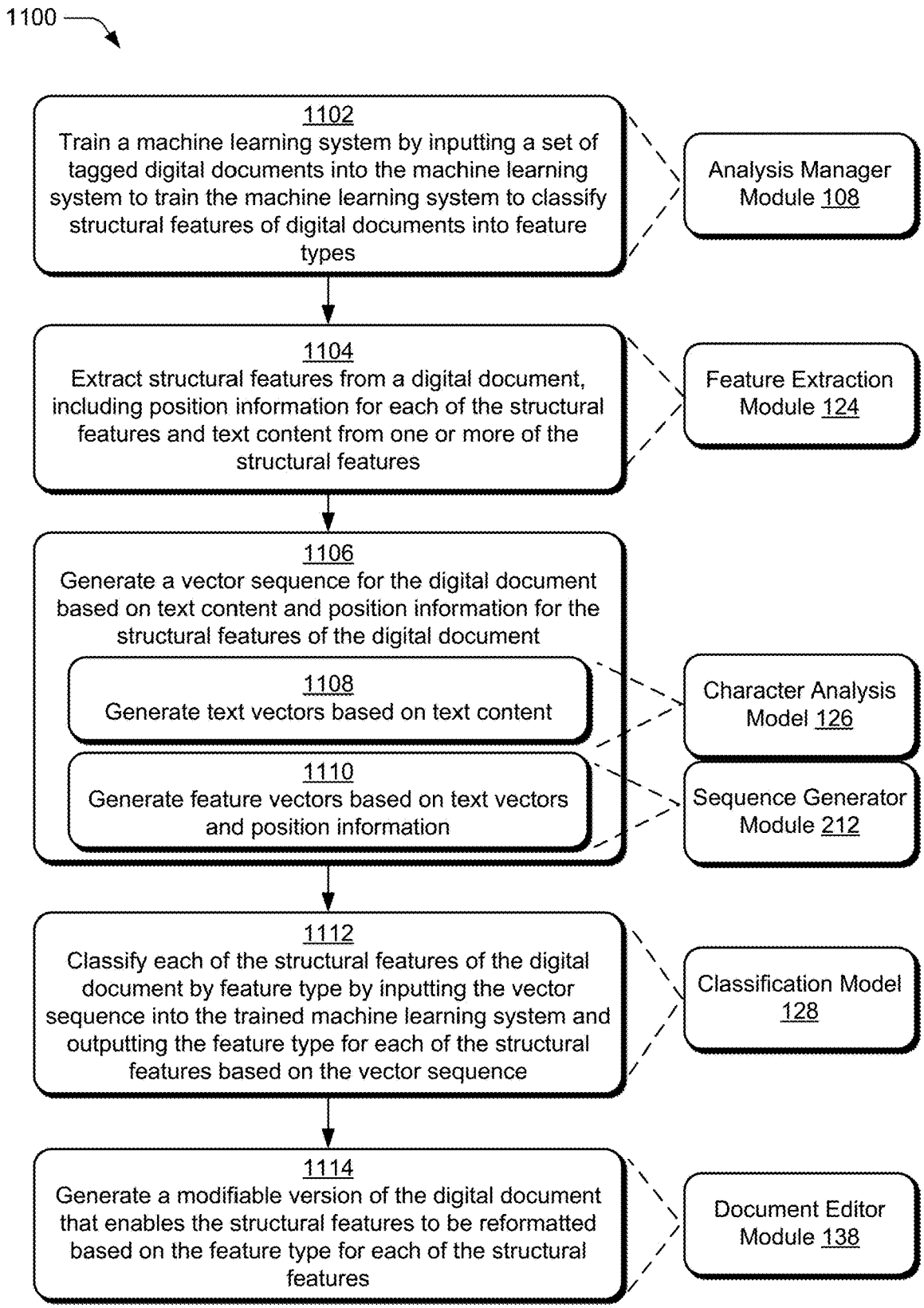
FIG. 11 depicts an example procedure for classifying structural features of a digital document by feature type, and for generating a modifiable version of the digital document.

FIG. 11 depicts an example procedure 1100 for classifying structural features of a digital document, and for generating a modifiable version of the digital document. Step 1102 trains a machine learning system by inputting a set of tagged digital documents into the machine learning system to train the machine learning system to classify structural features of digital documents into feature types. The tagged digital documents, for instance, have structural features that are pre-labeled with specific feature types, examples of which are discussed above with reference to the training documents 134 and their tagged features 136. Thus, the character analysis model 126 and the classification model 128 can be trained using the training documents 134.

According to various implementations, the output of the character analysis model 126 is of size 500. Accordingly, $v_t$ generated for each structural feature of a digital document has dimension 500 while $v_s$ has dimension 4 with each structural feature represented as a 504 dimensional vector $v_c$. As part of the training process, out of an aggregate total of tagged forms, approximately 80% of the tagged forms are utilized for training and the remaining 20% are utilized for validation.

In configuring the classification model 128, the size of the forward and backward LSTMs in the context determination model 902 can be set to 500 resulting in $h_j$ having a dimension of 1000. Further, the size of the decoder model 904 Decθ is set to 1000 and the size of attention layer 906 is set to 500. In one or more implementations, a batch size of 8 is used while training. Further, for optimizing model parameters, an Adam Optimizer can be used with a learning rate of $10^{-4}$. Generally, the model parameters are optimized to maximize the log likelihood of feature types in the pages of the training documents 134. In at least one implementation, this can be achieved by minimizing the mean (taken over multiple pages of the training documents 134) of cross entropy loss between predicted softmax probability distribution of each structural feature in a page and one-hot vectors corresponding to their actual output class. Hence, the objective loss function becomes:

$$loss_S = \frac{1}{n}\sum_{i=1}^{N}\sum_{j=1}^{n} -(\log(p_j^i) \cdot l_j^i)$$

where "•" is the dot product operation, N is a number of pages in a training document 134, n is a maximum number of structural features in a page of a training document, and the summation of j is performed to account for all structural features in a page. $p_j^i$ is a softmax probability vector (as predicted by the models) over different possible output categories and $l_j^i$ is the one-hot vector corresponding to actual class of $j^{th}$ structural feature in $i^{th}$ training document 134, with the ordering of the structural features done spatially as discussed in 'preprocessing' section, above.

Step 1104 extracts structural features from a digital document, including position information for each of the structural features and text content from one or more of the structural features. The feature extraction module 124, for instance, performs an optical scan of a digital document 114 to identify its structural features, which can include text content and other graphical features.

Step 1106 generates a vector sequence for the digital document based on text content and position information for the structural features of the digital document. For example, and as detailed above, at step 1108 the character analysis model 126 takes the text content of the digital document as input, and generates text vectors that represent the text content. At step 1110, the sequence generator module 212 then utilizes the text vectors and the position information to generate feature vectors for the structural features of the digital document, and a vector sequence utilizing the feature vectors.

Step 1112 classifies each of the structural features of the digital document by feature type by inputting the vector sequence into the trained machine learning system, and outputting the feature type for each of the structural features based on the vector sequence. The vector sequence 816, for instance, is input to the classification model 128, which outputs the feature categorizations (e.g., feature type $c_t$) for the structural features of the digital document.

Step 1114 generates a modifiable version of the digital document that enables the structural features to be reformatted based on the feature type for each of the structural features. The document editor module 138, for example, generates a version of the digital document that enables the structural features to be modified in various ways, such as by moving the structural features to different positions within the digital document, modifying content of the structural features, adding or deleting structural features, and so forth. Generally, the modifiable version of the digital document enables the structural features to be modified while maintaining a semantic context of the structural features relative to the digital document.

Figure 12:
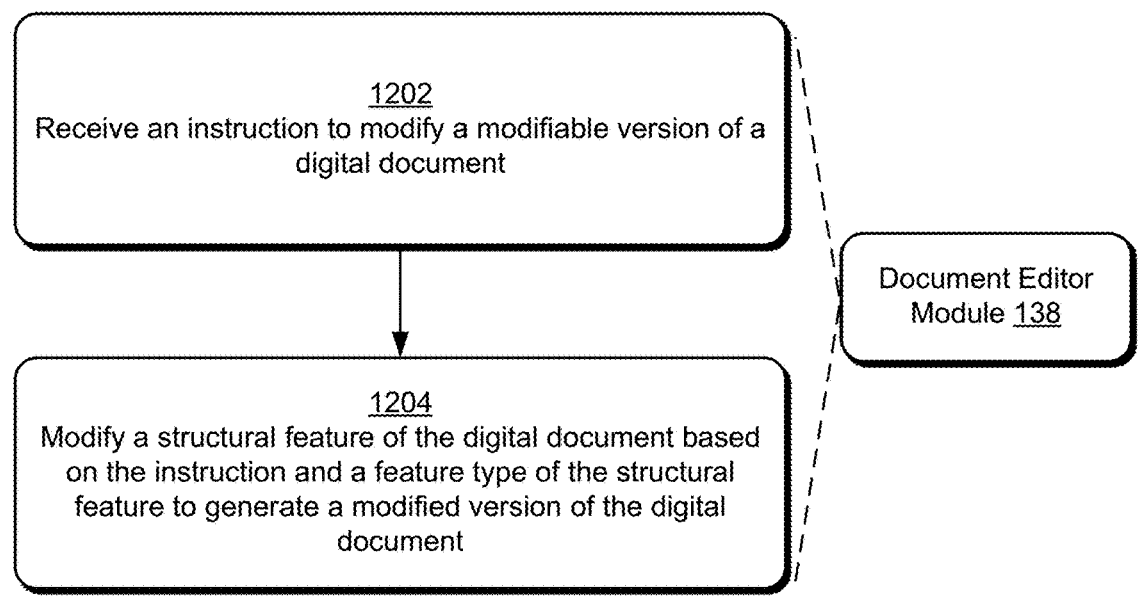
FIG. 12 depicts an example procedure for modifying a digital document.

FIG. 12 depicts an example procedure 1200 for modifying a digital document. Step 1202 receives an instruction to modify a modifiable version of a digital document. In at least one implementation, the instruction is generated by an automated process, such as automatically by the document editor module 138. For instance, the document editor module 138 determines that the digital document is to be displayed on a particular device, such as the client device 104. Accordingly, the document editor module 138 can generate an instruction to modify the digital document to be displayable on the client device 104. The instruction, for example, can specify that the digital document is to be modified for display based on various attributes of the display device 118 of the client device 104, such as display size, resolution, and so forth.

Additionally or alternatively, the instruction to modify the digital document can be based on user input, such as input by a user to the document editor module 138 specifying a particular modification to be made to the digital document.

Step 1204 modifies a structural feature of the digital document based on the instruction and a feature type of the structural feature to generate a modified version of the digital document. Generally, the structural feature can be modified in various ways, such as by moving the structural feature to a different positions within the digital document, modifying content of the structural feature, adding or deleting the structural feature, and so forth. According to various implementations, the modification considers the feature type of the structural feature and thus enables a semantic context of the structural feature to be preserved as part of modifying the structural feature. For instance, consider that the structural feature is categorized as a list item from a list of items in the digital document. In an example modification, the list item is moved to a different position in the digital document. To preserve the semantic context of the list item, the entire list can be moved such that the context of the list item is preserved. Accordingly, technique described herein enable structural features of a digital document to be reformatted (e.g., reflowed) while preserving their semantic content, e.g., their structural "meaning" within the context of the digital document as a whole.

Having described example procedures in accordance with one or more implementations, consider now an example system and device that can be utilized to implement the various techniques described herein.

Example System and Device

Figure 13:
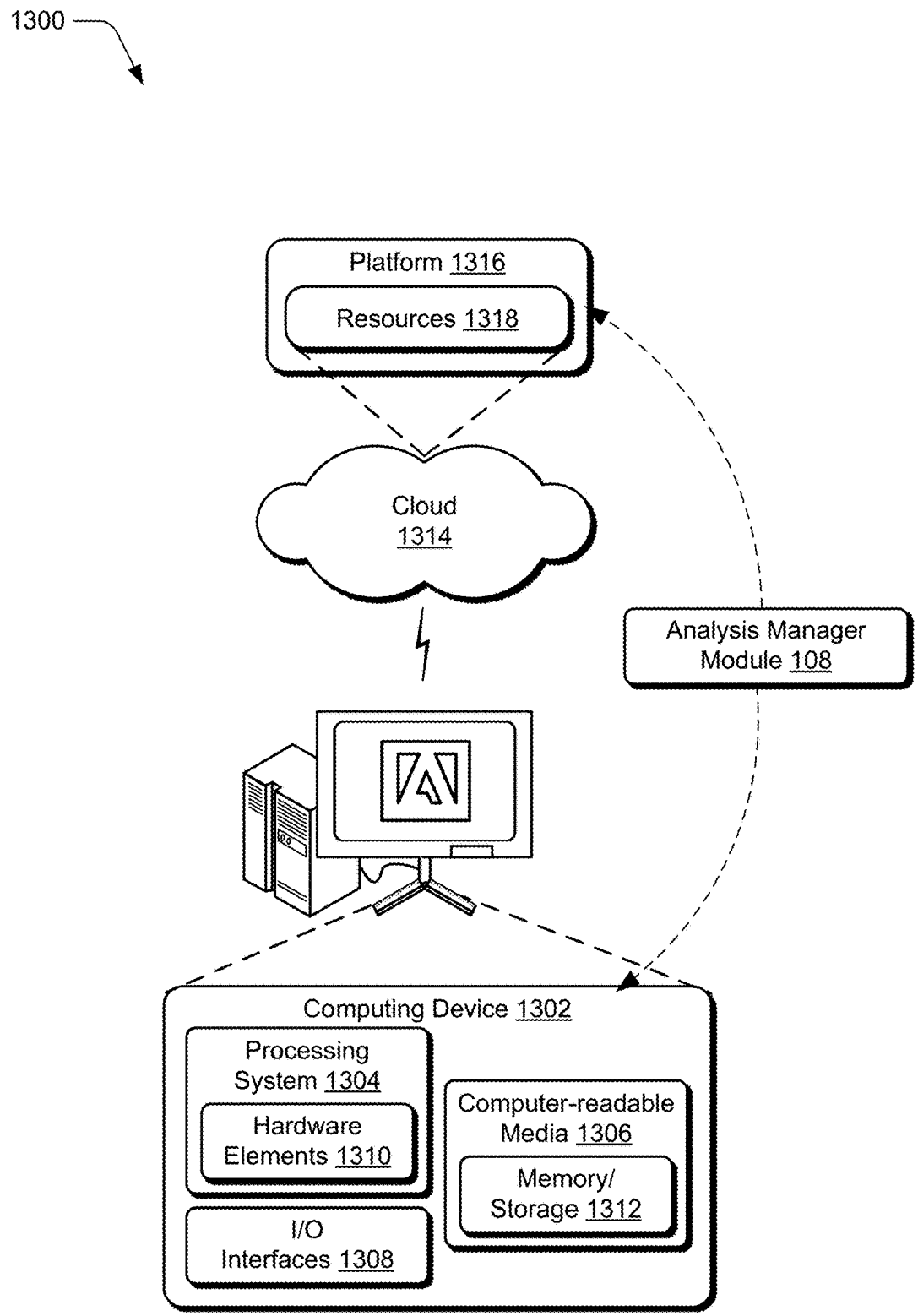
FIG. 13 illustrates an example system including various components of an example device that can be implemented as any type of computing device as described and/or utilized with reference to FIGS. 1-12 to implement aspects of the techniques described herein.

FIG. 13 illustrates an example system generally at 1300 that includes an example computing device 1302 that is representative of one or more computing systems and/or devices that may implement the various techniques described herein. This is illustrated through inclusion of the analysis manager module 108. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to extract structural features from a digital document and generate an editable version of the digital document, a method implemented by at least one computing device, the method comprising:

extracting, by the at least one computing device, structural features from a digital document, including position information for each of the structural features and text content from one or more of the structural features;

generating, by the at least one computing device, text vectors for the one or more of the structural features by processing the text content and converting the text content into text vectors, said generating the text vectors including:

inputting a first portion of a text sequence of the text content into a neural network that is trained to predict a subsequent character in a second portion of the text sequence; and receiving from the neural network a text vector for the text sequence including a portion of the text vector that is based on the predicted subsequent character in the second portion of the text sequence;

generating, by the at least one computing device, a vector sequence that includes the text vectors and the position information for each of the structural features;

classifying, by the at least one computing device, each of the structural features by feature type by processing the vector sequence to determine a document context for each of the structural features relative to the digital document, and classifying each of the structural features into a respective feature type based on the document context for each structural feature; and generating, by the at least one computing device, a modifiable version of the digital document that enables the structural features to be reformatted based on the feature type for each of the structural features.

2. A method as described in claim 1, wherein the position information for one or more of the structural features comprises coordinates for a corner of a bounding box of the one or more structural features, a width of the bounding box, and a height of the bounding box.

3. A method as described in claim 1, wherein said generating the vector sequence comprises:

generating feature vectors for each of the structural features based on a text vector and position information for each of the structural features; and concatenating the feature vectors for the structural features to generate the vector sequence.

4. A method as described in claim 1, wherein said generating the vector sequence comprises:

generating feature vectors for each of the structural features based on a text vector and position information for each of the structural features;

sorting the structural features into a sorted order based on their position in the digital document; and concatenating the feature vectors based on the sorted order to generate the vector sequence.

5. A method as described in claim 4, wherein the sorted order is based on a reading order for the digital document.

6. A method as described in claim 1, wherein said classifying each of the structural features by feature type comprises:

processing the vector sequence by inputting the vector sequence into a context determination machine learning model that considers structural features represented by the vector sequence in a forward and backward direction relative to the vector sequence, and receiving a context aware representation of the structural features from the context determination machine learning model; and inputting the context aware representation into a decoder machine learning model that is configured to categorize structural features into a defined set of categories of feature types, and receiving a feature type for each of the structural features as output from the decoder machine learning model.

7. A method as described in claim 1, wherein the modifiable version of the digital document enables a particular structural feature of the digital document to be modified while maintaining a semantic context of the particular structural feature relative to the digital document.

8. A method as described in claim 1, wherein the neural network comprises a long short-term memory (LSTM) machine learning model.

9. A method as described in claim 1, wherein said generating the vector sequence comprises:

concatenating the text vectors and the position information to generate feature vectors that each represent a respective structural feature of the digital document;

sorting the structural features into a sorted order based on their relative position in the digital document including performing a vertical sort and a horizonal sort of the structural features; and concatenating the feature vectors based on the sorted order to generate the vector sequence.

10. A method as described in claim 9, wherein said sorting comprises: performing the vertical sort to identify a first structural feature of the digital document;

and performing the horizonal sort starting with the first structural feature and proceeding horizontally to identify a second structural feature.

11. In a digital medium environment to classify structural features of a digital document by feature type and to generate an editable version of the digital document, a method implemented by at least one computing device, the method comprising:

generating, by the at least one computing device, a vector sequence for the digital document by inputting text content and position information for structural features of the digital document to a trained machine learning system, and receiving the vector sequence as output from the machine learning system, said generating the vector sequence including:

receiving text vectors that represent the text content, and concatenating the text vectors and the position information to generate feature vectors that each represent a respective structural feature of the digital document;

sorting the structural features into a sorted order based on their relative position in the digital document including performing a vertical sort and a horizonal sort of the structural features; and concatenating the feature vectors based on the sorted order to generate the vector sequence;

classifying, by the at least one computing device, each of the structural features of the digital document by feature type by inputting the vector sequence to the machine learning system, and receiving the feature type for each of the structural features as output from the machine learning system based on the vector sequence; and generating, by the at least one computing device, a modifiable version of the digital document that enables the structural features to be reformatted based on the feature type for each of the structural features.

12. A method as described in claim 11, wherein the machine learning system includes a character analysis machine learning model and a classification machine learning model, and wherein the method further comprises training the machine learning system by:

training the character analysis machine learning model to predict text characters in text strings of the text content, and to generate text vectors that represent the text content; and training the classification machine learning model to receive the vector sequence including the text vectors as input, and to output the feature type for each of the structural features based on the vector sequence.

13. A method as described in claim 11, wherein said sorting comprises a vertical sort starting from a top of the digital document to vertically locate structural features, and a horizontal sort to horizontally locate structural features relative to the vertical sort.

14. A method as described in claim 11, wherein the machine learning system comprises a character analysis machine learning model and a classification machine learning model, and wherein:

said generating the vector sequence is performed by the character analysis machine learning model; and said classifying each of the structural features of the digital document by feature type comprises inputting the vector sequence into the classification machine learning model, and receiving a feature type classification for each of the structural features.

15. A method as described in claim 11, wherein said sorting comprises:

performing the vertical sort to identify a first structural feature of the digital document;

and performing the horizonal sort starting with the first structural feature and proceeding horizontally to identify a second structural feature.

16. A system for classifying structural features of a digital document by feature type and for generating a modifiable version of the digital document, the system comprising:

a feature extraction module implemented at least partially in hardware of at least one computing device to extract structural features of the digital document, text content from the structural features, and position information for the structural features;

a character analysis model implemented at least partially in the hardware of the at least one computing device to implement a machine learning model to take as input the text content from the structural features, and to generate text vectors that represent the text content, wherein to generate the text vectors includes to:

input a first portion of a text sequence of the text content into a neural network that is trained to predict a subsequent character in a second portion of the text sequence; and receiving from the neural network a text vector for the text sequence including a portion of the text vector that is based on the predicted subsequent character in the second portion of the text sequence;

a classification model implemented at least partially in the hardware of the at least one computing device to take as input a vector sequence that includes the text vectors and the position information for the structural features, and to generate a feature type classification for each of the structural features; and a document editor module implemented at least partially in the hardware of the at least one computing device to generate the modifiable version of the digital document that enables the structural features to be reformatted based on the feature type for each of the structural features.

17. A system as described in claim 16, further comprising a sequence generator module configured to sort the structural features into a sorted order based on their relative position in the digital document, and to generate the vector sequence by arranging the text vectors and the position information based on the sorted order.

18. A system as described in claim 16, wherein the classification model comprises:

a context determination model to receive as input the vector sequence, and to generate as output a context aware representation of the structural features; and a decoder model to receive as input the context aware representation of the structural features, and to generate as output the feature type classification for each of the structural features.

19. A system as described in claim 16, wherein the document editor module is further configured to enable a particular structural feature to be reformatted while maintaining a semantic context of the particular structural feature relative to a feature type of the particular structural feature.

20. A system as described in claim 16, further comprising a sequence generator module configured to: concatenate the text vectors and the position information to generate feature vectors that each represent a respective structural feature of the digital document;

sort the structural features into a sorted order based on their relative position in the digital document including to perform a vertical sort and a horizonal sort of the structural features; and concatenate the feature vectors based on the sorted order to generate the vector sequence.

21. A system as described in claim 16, wherein to sort the structural features into a sorted order comprises to:

perform the vertical sort to identify a first structural feature of the digital document;

perform the horizonal sort starting with the first structural feature and to proceed horizontally to identify a second structural feature; and sort the structural features into a sorted order based on theft relative position in the digital document, and to generate the vector sequence by arranging the text vectors and the position information based on the sorted order.

* * * * *

UNITED STATES PATENT AND TRADEMARK OFFICE
CERTIFICATE OF CORRECTION

PATENT NO. : 11,003,862 B2
APPLICATION NO. : 16/359402
DATED : May 11, 2021
INVENTOR(S) : Milan Aggarwal and Balaji Krishnamurthy It is certified that error appears in the above-identified patent and that said Letters Patent is hereby corrected as shown below:

In the Claims

Column 24, Line 59, Claim 21: after "order based on", delete "theft", insert -- their --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*